United States Patent
Olsthoorn et al.

Patent Number: 5,215,427
Date of Patent: Jun. 1, 1993

[54] TRANSPORTER FOR POTTED PLANTS

[75] Inventors: Robertus M. C. Olsthoorn; Marcel A. M. Olsthoorn, both of De Lier, Netherlands

[73] Assignee: Visser's-Gravendeel Holding B.V., Netherlands

[21] Appl. No.: 785,235

[22] Filed: Nov. 1, 1991

Related U.S. Application Data

[63] Continuation of Ser. No. 511,425, Apr. 23, 1990, abandoned.

[30] Foreign Application Priority Data

Apr. 24, 1989 [NL] Netherlands .......................... 8901023
Sep. 22, 1989 [NL] Netherlands .......................... 8902377

[51] Int. Cl.⁵ ................................................ B66F 9/18
[52] U.S. Cl. .................................. 414/664; 414/668; 414/785; 414/623
[58] Field of Search ............... 414/659, 403, 404, 416, 414/607, 662, 663, 664, 665, 668, 669, 785, 623; 187/9 E

[56] References Cited

U.S. PATENT DOCUMENTS

| | | | |
|---|---|---|---|
| 2,843,280 | 9/1958 | Stopps | 414/607 |
| 3,045,850 | 7/1962 | Carr et al. | 414/607 |
| 3,097,009 | 7/1963 | Martin | 414/626 X |
| 3,187,917 | 6/1965 | Miller | 414/659 X |
| 3,715,045 | 2/1973 | Shawcroft | 414/623 |
| 3,760,966 | 9/1973 | Jones, Jr. et al. | 414/785 |
| 4,355,947 | 10/1982 | Wiblin | 414/664 X |

FOREIGN PATENT DOCUMENTS 934573 10/1955 Fed. Rep. of Germany .
1022637 9/1962 United Kingdom .

*Primary Examiner*—Michael S. Huppert
*Assistant Examiner*—James Keenan
*Attorney, Agent, or Firm*—Wegner, Cantor, Mueller & Player

[57] ABSTRACT

The invention relates to an apparatus for transporting potted plants arranged according to at least one row, in which the apparatus lifts and transports the plant pots and fits them to a fork lift truck. The invention provides elongate cariers, wherein the interval between these carriers is smaller than the diameter at the top of the plant pot but greater than the diameter on the underside of the plant pot. This allows the apparatus to be displaced in the horizontal direction which contacts the plant pots, but also to lift the row of plant pots. According to a preferred embodiment the device is provided with two bearing surfaces for the plant pots. This doubles the carrying capacity of the apparatus. According to another preferred embodiment, said elongate carrier comprises disconnecting mechanism, allowing it to pick up only a limited number of plant pots in a row, for instance only every second plant pot. This allows decreasing the density of the plant pots.

14 Claims, 5 Drawing Sheets

TRANSPORTER FOR POTTED PLANTS

This application is a continuation of U.S. application Ser. No. 07/511,425, filed Apr. 23, 1990, now abandoned.

FIELD OF THE INVENTION

The invention relates to an apparatus for transporting potted plants arranged according to at least one row, in which the apparatus comprises means for lifting and transporting the plant pots.

BACKGROUND OF THE INVENTION

Such an apparatus is known and comprises, in particular, several rigid U-shaped carriers, each serving to support only one plant pot during the lifting and transporting thereof.

It is further known to transport a number of plant pots by placing the plant pots on pallets, lifting up and displacing the pallets provided for plant pots, preferably with a fork lift truck, for instance, and at the desired place, removing the potted plant from the pallets and setting them down by hand for further processing of the plants.

The drawback of the known devices is that they are very labor-intensive and, moreover, provision has to be made when using the pallets to prevent the pots from falling off the pallets during transportation thereof. On the other hand, when using the U-shaped carriers, these carriers are placed some height below the top edges of the plant pots, which easily leads to damage of the leafs of the plants present in the pots.

SUMMARY OF THE INVENTION

The invention provides an apparatus which does not have these drawbacks.

The device according to the invention is hereby characterized in that the device is provided with at least one bearing surface for plant pots connected to the frame including at least two elongate carriers, wherein the interval between the adjacent carriers is smaller than the diameter at the top side of the plant pot, but greater than the diameter at the underside of this plant pot.

The device according to the invention has the advantage that a coupling can be effected using means which enable the device to be displaced horizontally. Such means includes appropriately a forklift truck or a handcart. A simple and easy displacement of the bearing surface is thus ensured.

Because the interval between the adjacent carriers is greater than the diameter on the underside of the plant pots placed in a row, the elongate carriers can be moved without any contact along these pots. Further, because the interval between the adjacent carriers is likewise smaller than the diameter on the top side of the plant pots placed in the row, these plant pots are lifted when the bearing surface is moved upward. This lifting of the potted plants therefore takes place from the underside of the pots so that the plants themselves are not damaged during lifting and displacing.

Moreover, because the potted plants are supported at a position between the top edge and the underside of the pots during lifting and displacing, there is no danger of one or more pots being lost during lifting.

The device is preferably provided with a number of, in particular two, bearing surfaces for plant pots. The bearing surfaces are appropriately connected to the frame relative to each other such that, at least in the lowest possible position, the elongate carriers of a bearing surface rest on the carriers of the bearing surface present thereunder. Although the number of bearing surfaces can be varied, the upper limit thereof is determined by the thickness of the elongate carriers used. From the starting position of the device, that is, the position wherein all the bearing surfaces rest on each other and are ready to be able to lift up the first row of plant pots, this lifting can only take place namely when the total thickness of the elongate carriers of the successive bearing surfaces stacked on each other still enables a substantially contact-free passage thereof along the plant pots.

Each bearing surface advantageously is provided with at least three, preferably thirteen, substantially horizontal, elongate carriers. It is thus possible to lift up and to displace simultaneously at least two, preferably twelve, rows of plant pots per bearing surface.

The device according to the invention is preferably connected to a controlling device for automatic control of the device. The use of such a device makes it possible to simultaneously lift up a great number of plant pots and set them down again at a distance from the original place in a simple manner and without exertion of manpower.

The free outer ends of the carriers are efficiently provided with plant pot locking means. These means prevent plant pots from being lost from the free outer ends of the carriers at a random point in time during lifting and displacing of the pots.

According to a preferred embodiment each carrier comprises a plant pot carrier disconnecting means. This allows it to lift several plant pots simultaneously and to relocate on mutual distances.

It is noted, that the plant pots are located adjacent to each other during the initial growing of the plants. To avoid the leafs of adjacent plants becoming mutually entangled during growth the plant pots have to be placed at a mutual distance after a period of time. Hereto this was executed by hand, which is rather labor-intensive.

Said preferred embodiment of the invention does not have these disadvantages.

The carriers are appropriately provided with several plant pot carrier disconnecting means, preferably at a mutual distance which corresponds with the largest outer dimension of a plant pot, and wherein the plant pot carrier disconnecting means in two adjacent carriers are staggered at least over a distance corresponding with the largest outer dimension of a plant pot.

Such a placing of the plant pot carrier disconnecting means enables simultaneous placing of a plurality of plant pots at a mutual distance.

The free extremity of two adjacent carriers is preferably provided with a plant pot carrier disconnecting means.

The plant pot carrier disconnecting means is preferably a recess which is arranged such that two adjacent carriers are recessed in the side facing one another. The distance between two adjacent carriers at the point of the recesses is appropriately greater than the largest diameter of the plant pot. It is hereby possible to set down a plant pot and then lift up and displace the carriers with the other plant pots, without the risk of damaging the plant in the set down pot.

The recess present in a carrier is effectively provided with an additional carrying element, the width of which substantially corresponds with the depth of the recess. Such an additional carrying element serves to support a plant pot to be moved from a row of plant pots, but wherein the distance to the preceding, already placed plant pot has to be enlarged.

The additional carrying element is preferably rotatable around a longitudinal side of the carrier. According to another effective embodiment, the additional carrying element is arranged in the carrier for outwardly sliding movement. Other embodiments of the additional carrying element are, of course, also possible.

Preferably, the additional carrying element is a thin plate, manufactured of a rigid material, in particular a plastic or a metal, preferably stainless steel. Of course, the carriers are provided with such thin plates in the non-active state, adjacent carriers have to be spaced at the point of the recess in order to allow vertical displacement of the carriers along the plant pots without lifting up the plant pots.

The device according to the invention is preferably connected to a controlling device for automatic control of the device. The use of such a controlling device makes it easy to lift up and place at a mutual distance a great number of plant pots in a simple manner, without the exertion of manpower.

The invention likewise relates to a method for placing plant pots at a mutual distance, wherein a number of plant pots placed in a row are lifted up and placed at a mutual distance at the same time, which is hereby characterized in that a row of placed plant pots is simultaneously lifted whereafter the lifted plant pots are displaced over a desired distance, the plant pots are subsequently set down and at least one plant pot is separated from the row, the remaining plant pots are once again lifted and displaced over a desired distance, after which a following plant is separated from the row and the above mentioned operations are repeated until the last pot in the row is placed at a distance from the preceding plant pot.

The plant pots are preferably separated from a row beginning with the first plant pot of this row.

For separating a plant pot it is effective to enlarge the interval between the carriers at the point of this plant pot to an interval that is greater than the largest outer dimension of the plant pot.

According to an embodiment which is particularly recommended, two rows of plant pots are set down in staggered position relative to one another because the plant pots are lifted up simultaneously, whereafter the lifted plant pots are displaced over a desired distance, the plant pots are subsequently set down, at least one plant pot is separated from the first row by enlarging the interval of the carriers at the position of this plant pot to an interval greater than the largest outer dimension of the plant pot, the remaining plant pots are lifted once again and displaced over the desired distance, whereafter the following plant pot of the first row in addition to a plant pot from the second row, which is in a staggered position relative to this plant pot from the first row, are separated and the operations are repeated until the last pot of each row is placed at a distance from the preceding plant pot.

BRIEF DESCRIPTION OF THE DRAWINGS

The invention will be further elucidated hereafter with reference to the annexed drawing, in which.

DETAILED DESCRIPTION OF THE PREFERRED EMBODIMENTS

Figure 1:
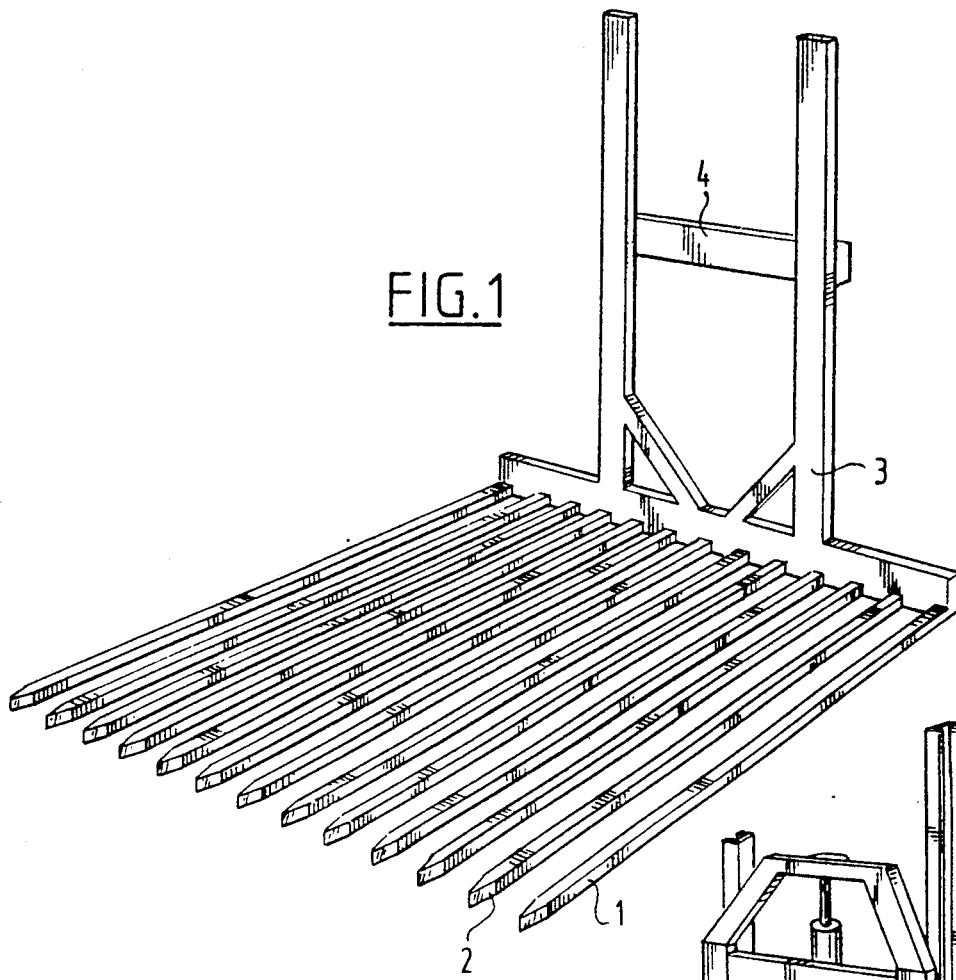
FIG. 1 shows a perspective front view of a first embodiment of a device according to the invention.

A first embodiment of the device according to the invention is shown in FIG. 1.

As shown, the device comprises elongate, preferably horizontal carriers such as 1 and 2, which are connected to a frame 3. This frame 3 is provided with a coupling member 4, whereby it is possible to couple the device to, for instance, a forklift truck.

It is noted that this coupling member can be of any design suitable for the present purpose, and is not further shown for the sake of clarity.

It is in this way possible to displace the device vertically as well as horizontally.

The interval between the carriers is, of course, adapted to the dimensions of the plant pots to be displaced. When the length of the carriers and the width of the bearing surface amount to ±1.5 m., the device shown, which comprises 13 carriers, can lift and displace 12 rows of plant pots with 12 pots in each row. By therefore coupling the device to, for instance, a forklift truck, it is thus possible to lift and displace 144 potted plants at the same time, without any use of manpower. This number per bearing surface can, of course, be modified by adapting the number of carriers.

Figure 2:
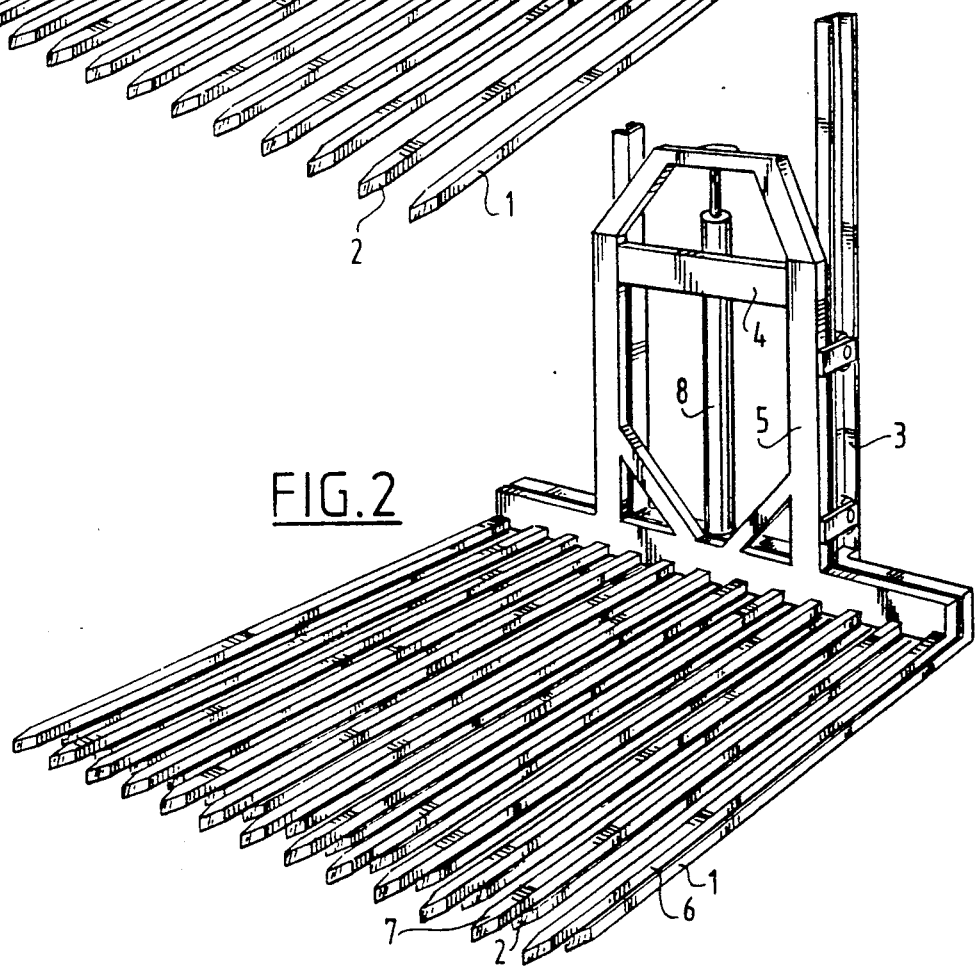
FIG. 2 shows a perspective view of a preferred embodiment of the apparatus according to the invention.
Figure 3:
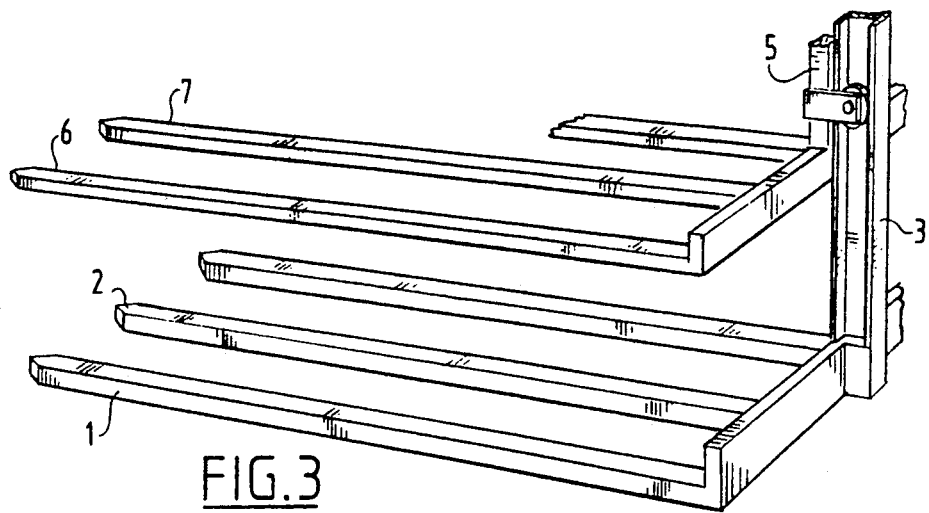
FIG. 3 shows another view of the apparatus according FIG. 2.

A preferred embodiment of the device according to the invention is shown schematically in FIG. 2. More particularly, this embodiment comprises two bearing surfaces for plant pots placed above one another, including elongate carriers (such as 1 and 2 and 6 and 7). The bearing surface with the carriers 1 and 2 is connected to the frame 3 which is provided with a coupling member 4 to enable a coupling to for instance, a forklift truck. Frame 5 which is connected with the carriers (such as 6 and 7) is connected to frame 3 such that a vertical displacement along the columns of frame 3 can be effected. This can, for instance, be ensured using a piston device 8. It is noted that the carriers 1 and 6, and 2 and 7 respectively of both bearing surfaces rest upon each other in the start position and in efficient manner have the same width and mutual interval. Shown schematically in FIG. 3 is the situation wherein frame 5 is vertically displaced relative to frame 3.

The operation of the device according to the invention is as follows, beginning with plant pots which all rest on a ground surface.

The device as shown in FIG. 2, wherein the bearing surfaces rest on each other, is displaced such that the rows of plant pots to be lifted and displaced are situated between the successive carrier assemblies (1, 6 and 2, 7 etc.).

Although in the embodiment shown here the device has two bearing surfaces, this number can be increased, provided that it is ensured that the total height of the carriers above each other allows passage thereof in the start position along the plant pots for lifting.

The plant pots present between the carrier assemblies are then lifted by displacing the frame 5 vertically relative to frame 3. Because the interval between adjacent carriers is smaller than the diameter on the top side of a plant pot, the plant pots will remain hanging between the carriers.

The bearing surface connected to frame 5 is spaced from the bearing surface connected to frame 3 at an interval such that the carriers connected to frame 3 (such as 1 and 2) can be used to lift a following collection of plant pots.

The plant pots disposed on the various bearing surfaces are subsequently transported and set down on the desired position by performing the above explained operations in reverse sequence.

Figures 4A, 4B, 4C, 4D:
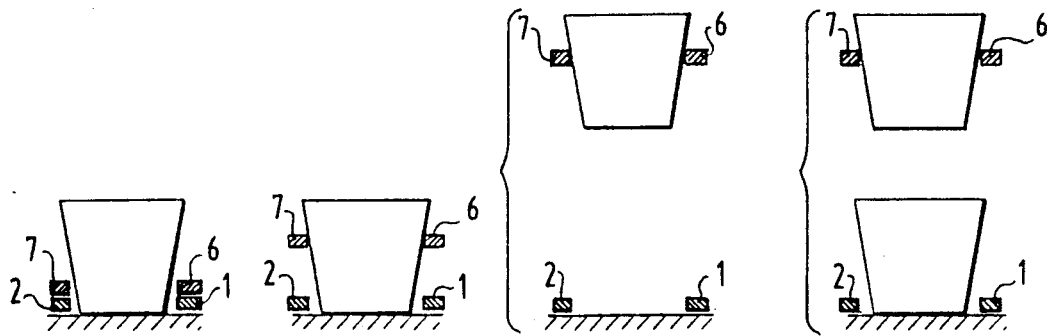
FIGS. 4a-4d show front views of several stages during the lifting of the plant pots with the device according to FIG. 2.

FIG. 4 shows several stages during lifting of plant pots with a device as shown in FIG. 2, that is, with two bearing surfaces. Shown more particularly in FIG. 4a is the starting position wherein the carrier assemblies 1, 6 and 2, 7 are situated close to the bottom of the plant pot and on either side thereof. Shown in FIG. 4b is the situation wherein the bearing surface with the carriers 6, 7 is displaced by displacing frame 5, such that the plant pots still just support on the ground surface. By further displacing frame 5, the plant pots are lifted up (FIG. 4c) and another collection of plant pots can be lifted up with the carriers such as 1, 2 connected to frame 3 and remaining in the start position (see FIG. 4d).

It is noted that the carriers (1, 2, 6, 7) as shown have a rectangular section. It will, however, be apparent to a person skilled in the art that these can also have, for instance, a round section. In addition, the carriers can be hollow.

The free outer ends of the carriers can, in addition, be provided with plant pot locking means. Such means serve to prevent the plant pots close to the outer ends of the carriers from falling off the device during lifting and displacing thereof.

Figure 5:
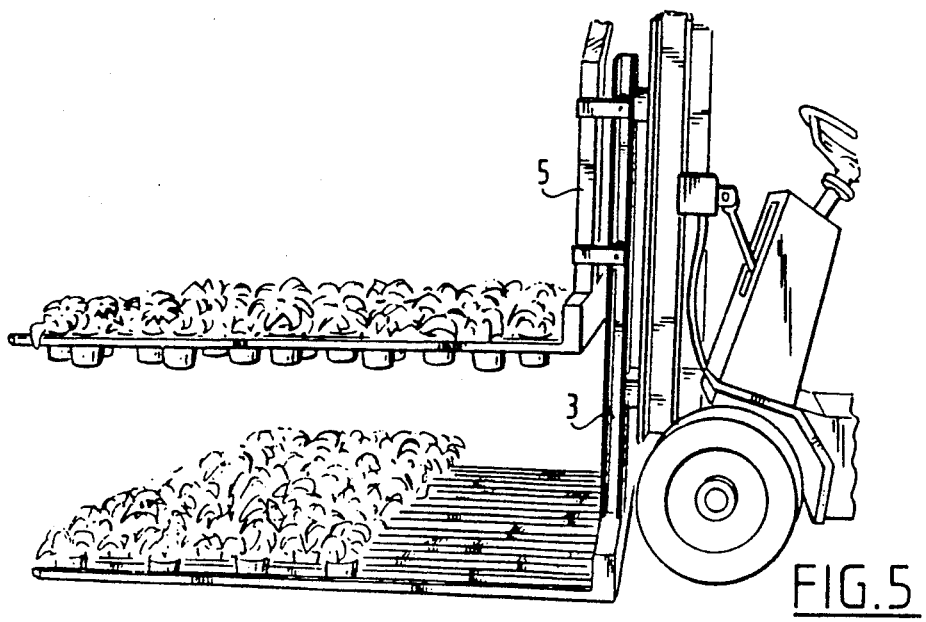
FIG. 5 shows a side view of an apparatus according to FIG. 3 connected with the fork lift truck.

FIG. 5 shows a side view of an embodiment of a device according to the invention including two bearing surfaces which are provided with the potted plants for moving, and wherein the device is coupled to a (partially shown) forklift truck. The number of bearing surfaces can of course be increased, provided the total height of the elongate carriers placed on each other does not obstruct the problem-free passage thereof along the plant pots.

Figure 6:
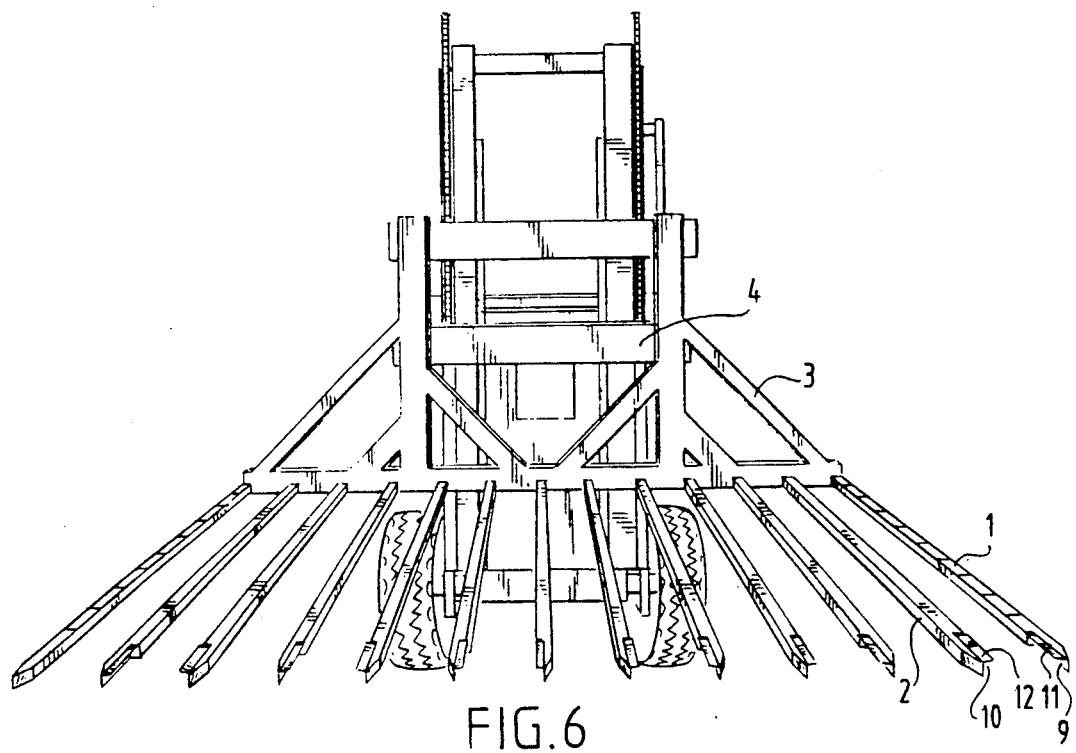
FIG. 6 shows a perspective front view of a first embodiment of an apparatus according to the invention, connected with a fork lift truck.

In FIG. 6 the device according to the invention is shown connected to a forklift truck. As depicted, the device comprises horizontal, elongate carriers, such as the carriers 1 and 2, which are connected to a frame (3). This frame (3) is provided with a coupling member (6) whereby it is possible to connect the device to the forklift truck.

It is noted that this coupling member can have any design suitable for the present purpose, and for the sake of clarity is therefore not further shown.

Figure 6A:
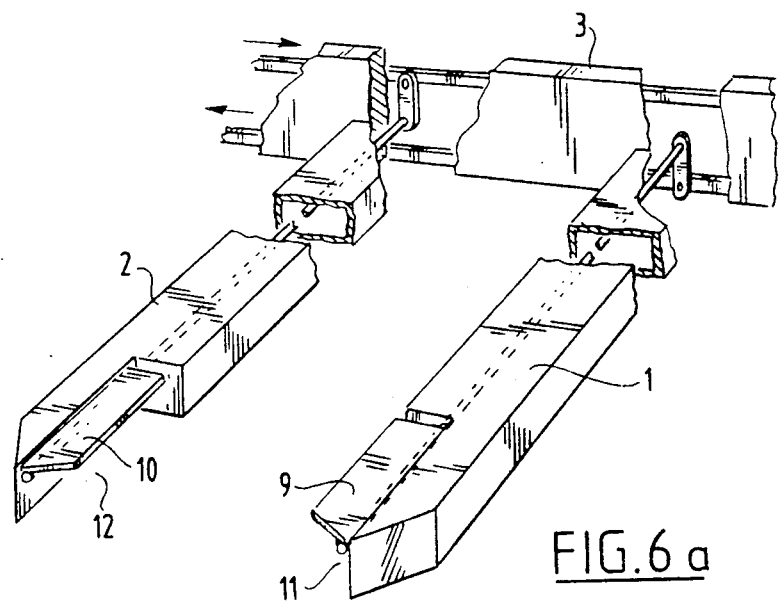
FIG. 6a shows a schematic top view of the free ends of two adjacent carriers according to the embodiment shown in FIG. 1.

It is thus possible to displace the device vertically as well as horizontally. In the embodiment shown here the free outer end of each carrier is provided with a recessed portion g, 10 in a manner such that the recesses are arranged in the sides facing each other of two adjacent carriers. The recesses g and 10 of the respective carriers 1 and 2 are shown in FIG. 6a in top view. These recesses can be provided with additional carrying elements 11, 12, preferably in the form of thin plates as depicted in FIG. 6. These elements are rotatable around a longitudinal side of the carrier and have a width which substantially corresponds with the depth of the recess. The thickness of the elements 11, 12 and the depth of each recess is such that the distance between the carriers is sufficient to enable a vertical displacement of the carriers along a plant pot. The distance between the carriers is, of course, adapted to the dimensions of the plant pots to be displaced. The device depicted here can, for instance, be used for placing at a distance 12 rows of plant pots with 12 pots in each row, wherein the pots have a dimension of ±12 cm. The length of each carrier and the width of the device then amount to ±1.5 m. The method for placing plant pots at a distance using the present device will be further elucidated hereinafter with reference to FIG. g-12.

It is noted that the carriers 1, 2 are shown with a rectangular section. However it will be apparent to the person skilled in the art that these can likewise have for instance a round section. The carriers can in addition be hollow. This is particularly recommended for connecting the thin plates 11, 12 with a controlling device for automatic control.

Although the thin plates, such as 11, 12, are shown as elements which are rotatable around a longitudinal side of the carrier, the invention is not limited to such an embodiment. Another effective embodiment of the thin plates comprises that they can be pushed out of the hollow carriers to which they are connected to support a plant pot.

Figure 7:
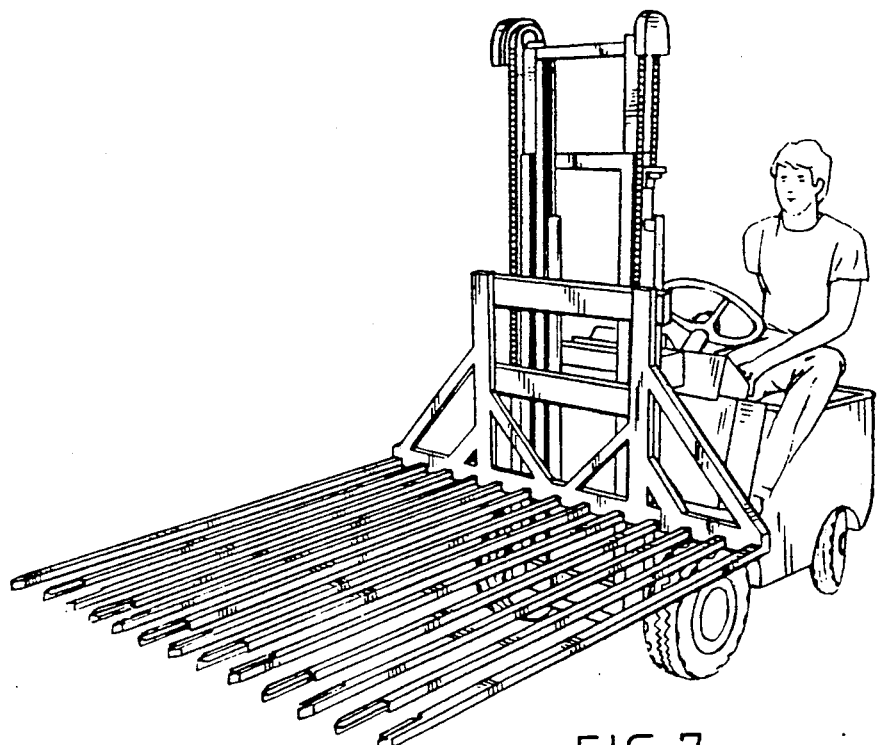
FIG. 7 shows an alternative embodiment of several adjacent carriers.

FIG. 7 shows the same device as depicted in FIG. 6 in perspective view and fixed to a forklift truck.

Figure 8:
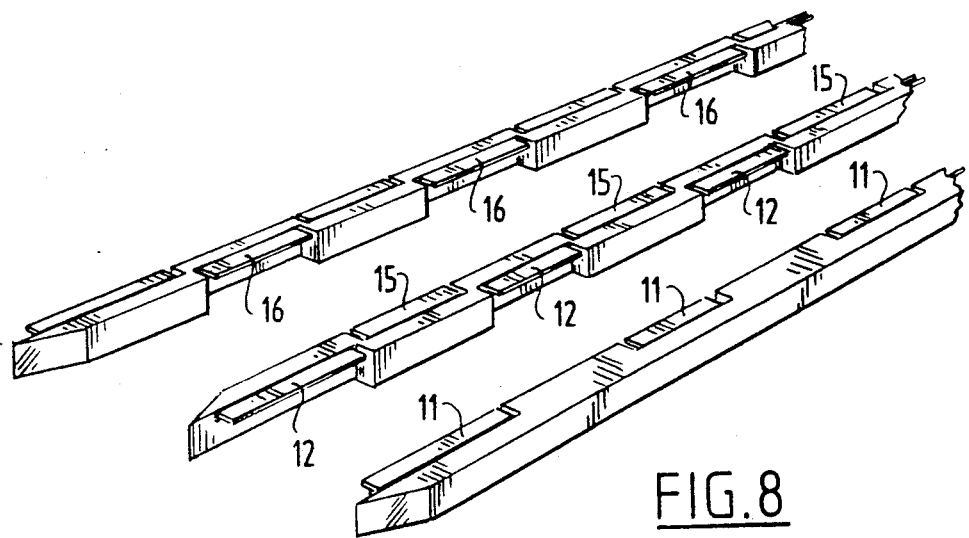
FIG. 8 shows a perspective view of the same apparatus as shown in FIG. 1.
Figure 9:
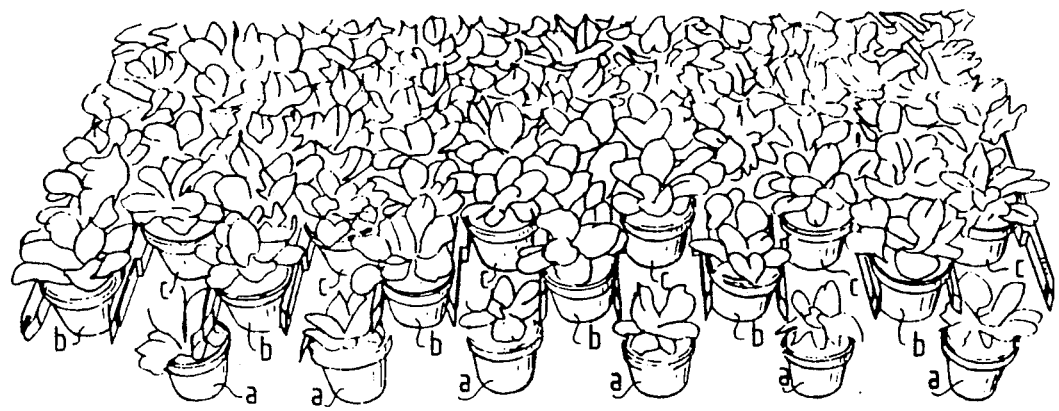
FIG. 9 shows a front view of a collection of plant pots during the placing at a distance according to the invention.

Shown in FIG. 8 is an alternative embodiment of the carriers wherein thin plates 11 and 12 are arranged in the relevant recesses close to the outer end of two adjacent carriers, corresponding to the situation shown in FIG. 6 and FIG. 7. Recesses are further arranged in the carriers at intervals from the first thin plates which correspond with at least the largest outer dimension of a plant pot, which recesses are likewise provided with thin plates 11, 12. Such an embodiment makes it possible to place an entire row of plant pots spaced at a mutual distance very rapidly.

FIG. g-12 show the different stages of placing plant pots at a mutual distance using a device according to the invention as shown in FIG. 6.

Figure 10:
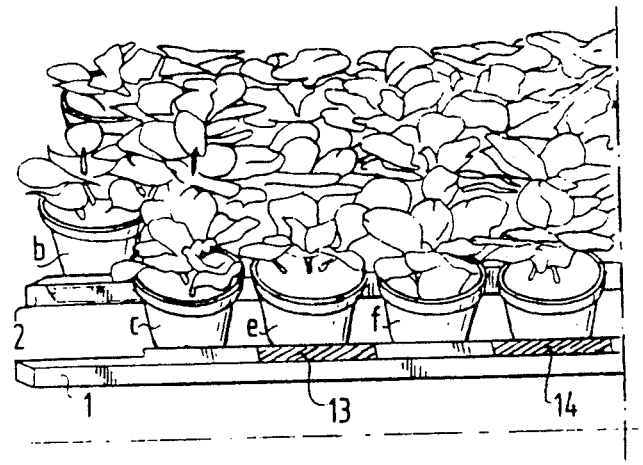
FIGS. 10-12 show successive stages of the placing at a distance of the plant pots with the device according to the invention.
Figure 11:
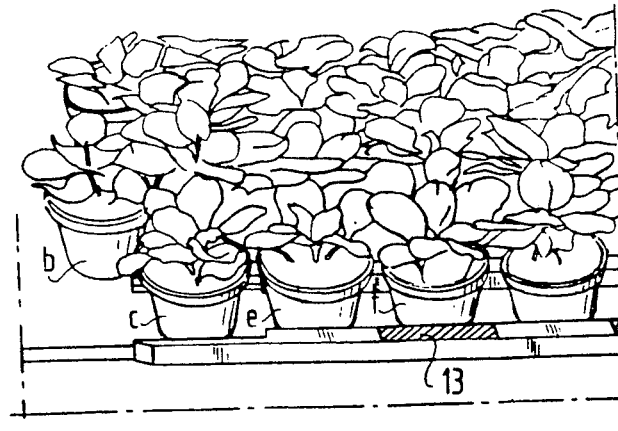

The first stage is shown in FIG. g. A first row of plant pots a has here already been set down. This is more particularly performed by arranging plant pots on the carriers of a device according to FIG. 7 or FIG. 8 and transporting them if desired. During transportation, the plant pots rest on the horizontal carriers. Further, the thin plates 11, 12 are now in active position, that is, in horizontal position to support the plant pots so that the same number of plant pots is always present between the carriers. The plant pots are subsequently all set down by lowering the frame whereby the carriers move downwardly. When the carriers are practically at the location of the bottom of the plant pots, the pots are resting on a ground surface and the thin plates are brought into their non-active state, that is, they are turned into vertical position. When the device is lifted, the plant pots a remain in place because the carriers have a larger interval at the point of the resulting recessed portions than the largest outer dimension of the plant pot. The plant pots b, c and further pots present in the rows are however lifted. The device, provided with these remaining plant pots, is then moved over a desired distance from the plant pots a, whereafter the plant pots are set down by lowering the frame. This situation is depicted in side view in FIG. 10. The plant pots now all rest on the ground surface. The horizontal carriers 1 and 2 are removed sufficiently far from the top edge of the plant pots to enable horizontal movement of these carriers without touching the set down pots. The carriers are subsequently displaced over a distance which substantially corresponds with the largest outer dimension of a plant pot. This distance is shown on the horizontal carrier with the shaded parts 13 and 14. The situation thus obtained is shown in FIG. 11. By comparing the situation shown in FIG. 11 with that of FIG. 5, it can be seen that plant pot b has come completely outside the reach of the horizontal carriers of the device, while plant pot c, which is in staggered position relative to plant pot b, is situated at the height of the recessed parts of the horizontal carriers. The markings 13, 14 arranged on the carrier 1 serve only to indicate the width of a plant pot.

Thereafter the plant pots are lifted by displacing the frame vertically upwards. The plant pots b and c then remain standing however. This situation is depicted in FIG. 12.

The above operations are repeated until all the plant pots present on the carriers are placed at a desired mutual distance.

Figure 12:
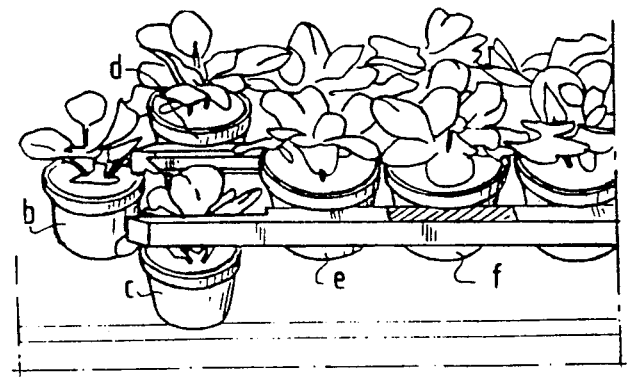

It is noted that the distance between the plant pots, such as b and c, can therefore be enlarged in diagonal direction by performing an extra operation between the situations shown in FIG. 11 and FIG. 12 which consists of first placing the thin plates, such as 11 and 12, into operational, that is, horizontal, position, lifting up the plant pots and setting them down at a distance. Thereafter the thin plates are placed in non-operational, that is, vertical, position. By placing the thin plates into operational state, the plant pots c will likewise be lifted and when the plant pots are set down again the distance between the plant pots b and c is consequently enlarged.

A rapid method, but one with little variation with regard to the mutual distance to be arranged between the plant pots, is performed with a device as shown schematically in FIG. 8. As depicted the carriers are provided with recesses in which carrying elements in the form of rotatable thin plates 11, 12, 15 and 16 are arranged. The recesses with their respective thin plates are arranged such that the plant pots in a row can be alternately supported by the carrying elements, while the plant pots in the adjacent row are supported in staggered manner relative to this first row by additional carrying elements. These carrying elements in the adjacent row are shown in FIG. 8 in the form of thin plates 15. The placing of the plant pots at a mutual distance herein takes place as follows.

During transportation the plant pots rest on the horizontal carriers, wherein the thin plates are situated in a horizontal position. Thereafter the plant pots are all set down by lowering the frame, whereby the carriers move downwardly. When the carriers are practically at the height of the bottom of the plant pots, the pots rest on the ground surface and the thin plates are turned to their non-active, that is, vertical, position. When the device is lifted up the plant pots which were supported by these additional carrying elements now remain standing, while the other plant pots are lifted up. The device, provided with the other plant pots, is then moved over a distance which at least corresponds with that of the plant pots already set down, whereafter these other plant pots are set down by lowering the frame.

It will be apparent to a person skilled in the art that diverse variants of the embodiments shown in FIG. 1 and FIG. 3 are possible. These variants also fall of course within the scope of the present invention.

We claim:

1. Apparatus for transporting plant pots arranged according to at least one row, in which the apparatus comprises means to lift and to displace frusto-conical shaped pots arranged according to at least one row, the apparatus comprising:
    at least one bearing surface for plant pots connected to a frame;
    each at least one bearing surface including at least two elongate carriers disposed adjacent one another;
    at least one recess formed in each elongate carrier, the recesses in adjacent carriers being mutually aligned;
    a carrying element movably disposed in each of said recesses, each said carrying element being movable between an active horizontal position, wherein each said carrying element is substantially coplanar with an upper surface of its corresponding carrier and wherein the interval between mutually aligned carrying elements is smaller than a diameter at a top side of a plant pot, but greater than a diameter at an under side of a plant pot, and an inactive vertical position, wherein the interval between mutually aligned carrying elements is greater than a diameter at a top side of a plant pot; and
    means for effecting movement of said carrying elements between their active and inactive positions.

2. Apparatus according to claim 1, characterized in that the apparatus comprises several bearing surfaces for plant pots, in which carriers belonging to several bearing surfaces are each located above each other.

3. Apparatus as in claim 2, wherein each carrier includes a plurality of said recesses spaced a distance from each other corresponding to the largest outer dimension of the plant pots, the recesses on each carrier being staggered from the recesses on each adjacent carrier.

4. Apparatus according to claim 1, characterized in that each bearing surface comprises at least three, substantially horizontal elongate carriers.

5. Apparatus according to claim 1, characterized in that each bearing surface comprises at least 13 substantially horizontal elongate carriers.

6. Apparatus as in claim 1, wherein two adjacent carriers each include a recess on the sides facing each other.

7. Apparatus as in claim 1, wherein the width of each carrying element is substantially the same as the depth of each recess, so that each carrying element is flush with its corresponding carrier when in its active position.

8. Apparatus as in claim 1, wherein each carrying element is pivotable in its corresponding recess.

9. Apparatus as in claim 1, wherein each carrying element is slidable in its corresponding recess.

10. Apparatus as in claim 9, wherein each carrying element is outwardly slideable.

11. Apparatus as in claim 1, wherein each carrying element is a thin plate formed of a stiff material.

12. Apparatus as in claim 11, wherein each said thin plate is formed of plastic.

13. Apparatus as in claim 11, wherein each said thin plate is formed of metal.

14. Apparatus as in claim 13, wherein said metal is stainless steel.

* * * * *